United States Patent [19]

Meyer et al.

[11] Patent Number: 5,316,097
[45] Date of Patent: * May 31, 1994

[54] LAWN MOWER

[75] Inventors: Robert B. Meyer, Middleburg Heights; John R. Lackner, Westlake; Hans J. Matuscheck; Daniel J. Kennedy, both of Parma, all of Ohio

[73] Assignee: The Scott Fetzer Company, Westlake, Ohio

[*] Notice: The portion of the term of this patent subsequent to Oct. 12, 2010 has been disclaimed.

[21] Appl. No.: 13,789

[22] Filed: Feb. 5, 1993

Related U.S. Application Data

[60] Continuation-in-part of Ser. No. 837,157, Feb. 18, 1992, Pat. No. 5,251,711, which is a continuation-in-part of Ser. No. 708,464, May 31, 1991, which is a division of Ser. No. 442,615, Nov. 19, 1989, abandoned.

[51] Int. Cl.$^5$ .............................................. B62D 51/04
[52] U.S. Cl. .................................... 180/19.1; 56/11.3; 180/19.3
[58] Field of Search ................... 180/19.1, 19.2, 19.3; 192/113 A; 74/376, 473 R; 15/340.2, 340.3, 329; 56/11.3

[56] References Cited

U.S. PATENT DOCUMENTS 2,860,473 11/1958 Wehner .
3,802,170 4/1974 Siefert et al. .
4,212,141 7/1980 Miyazawa et al. .
4,306,405 12/1981 Fleigle .
4,538,401 9/1985 Takamizawa et al. .
4,554,780 11/1985 Umeno et al. .
4,689,939 9/1987 Seyerle .
4,716,717 1/1988 Ogano et al. .
4,856,264 8/1989 Nishimura et al. .

Primary Examiner—Mitchell J. Hill
Attorney, Agent, or Firm—Watts, Hoffmann, Fisher & Heinke Co.

[57] ABSTRACT

A walk-behind, self-propelled lawn mower having a variable speed drive transmission responsive to operator-applied forces. The transmission includes an input gear operatively connected to the engine for constant rotation during operation, an intermediate gear meshed with the input gear, and a driving bevel gear meshed with a drive shaft bevel gear. A face of the driving bevel gear is biased away from a face of the intermediate gear. A clutching surface is interposed between the gear faces for coupling the intermediate gear and the driving bevel gear in driving engagement. An actuator lever is controllably connected to the intermediate gear and can be adjusted to vary the sensitivity of the drive transmission to operator-applied forces.

23 Claims, 5 Drawing Sheets

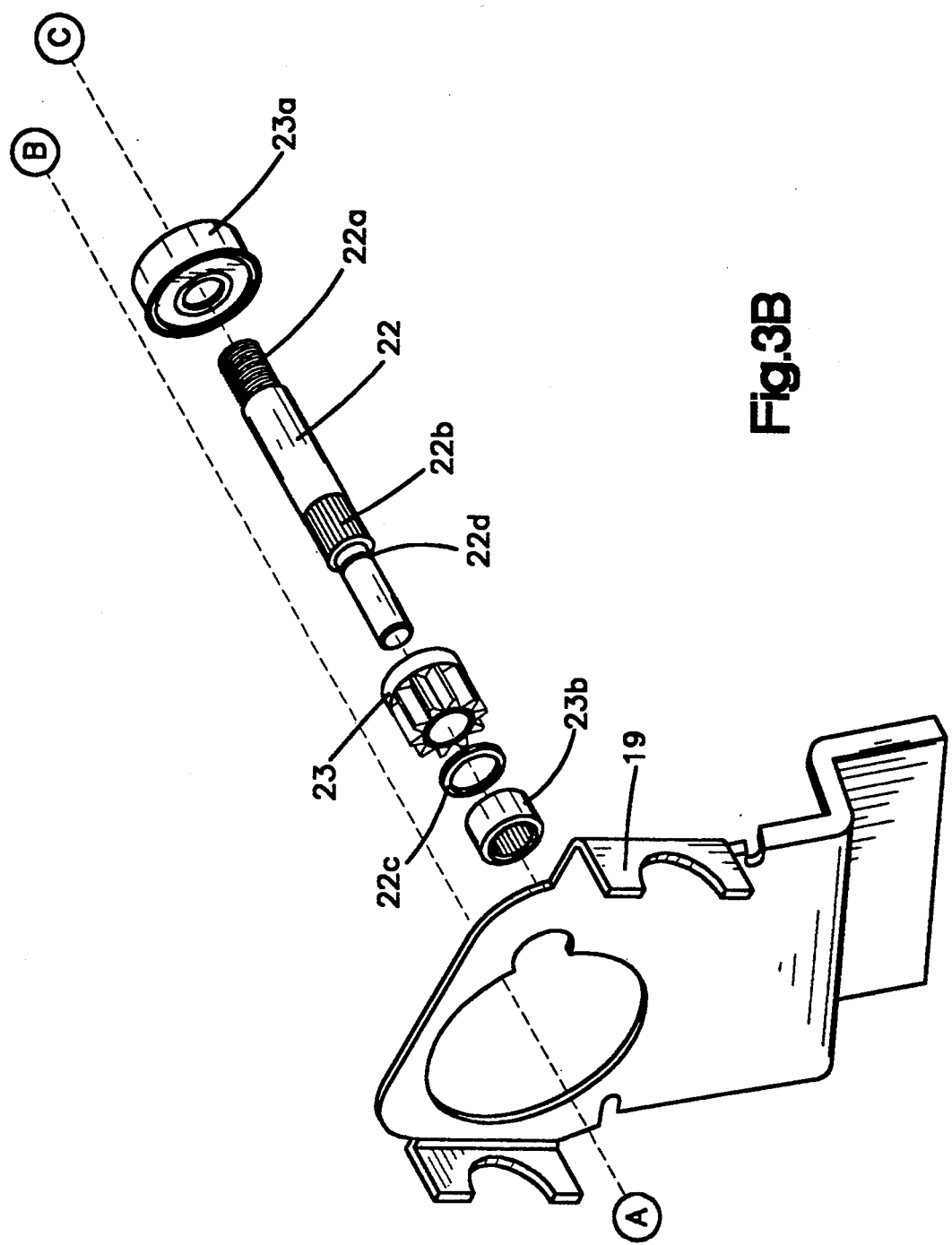

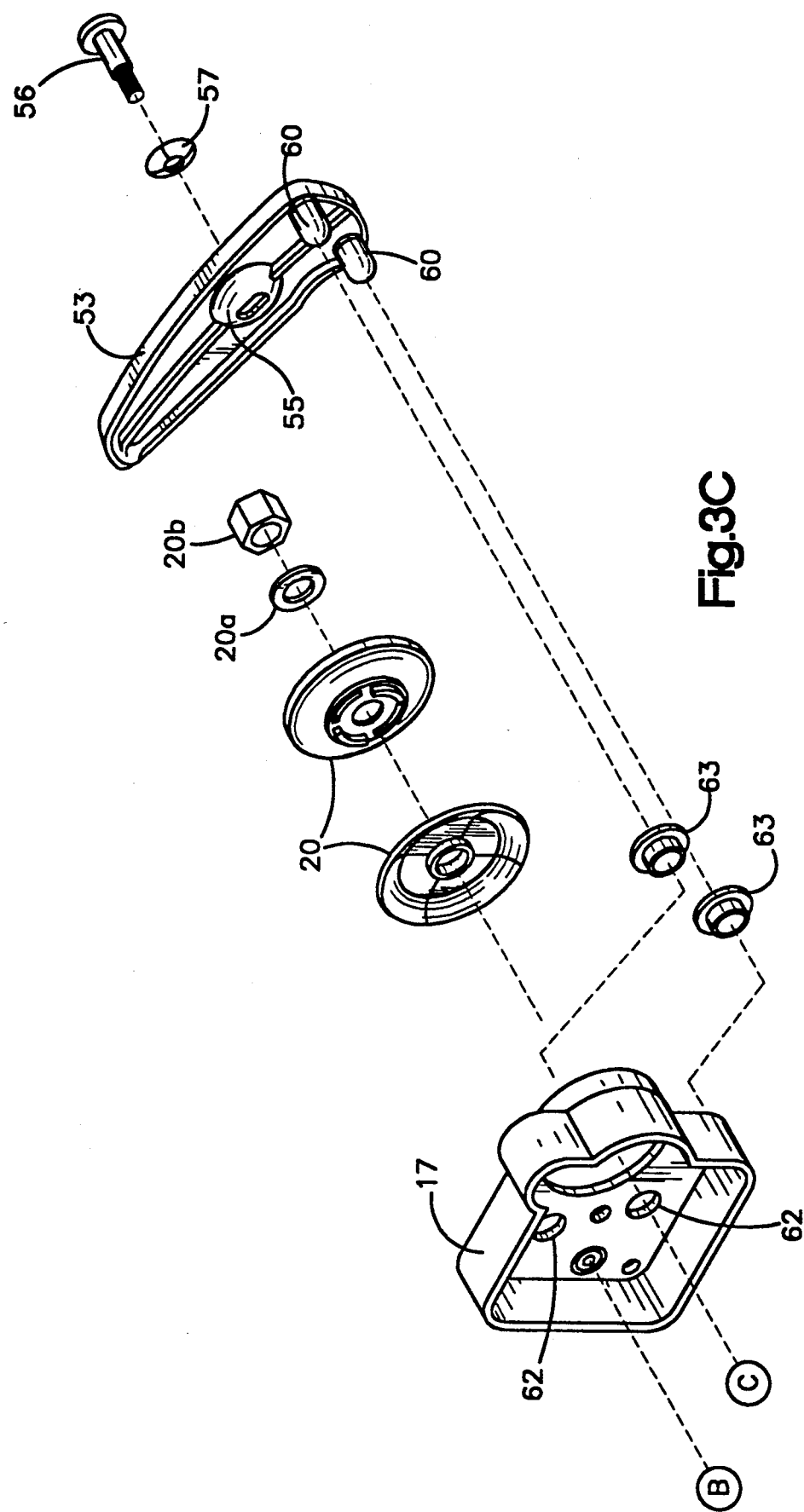

LAWN MOWER

This is a continuation-in-part of Ser. No. 07/837,157, filed Feb. 18, 1992, entitled "Lawn Mower," now U.S. Pat. No. 5,251,711 issued Oct. 12, 1993 which is a continuation-in-part of Ser. No. 07/708,464, filed May 31, 1991, entitled "Drive System," pending which is a divisional of Ser. No. 07/442,615, filed Nov. 29, 1989, entitled "Drive System" and now abandoned.

TECHNICAL FIELD

This invention relates to lawn mowers, and more specifically to self-propelled, walk-behind lawn mowers.

BACKGROUND

Self-propelled, walk-behind lawn mowers are typically limited to a speed that is proportional to the speed of an engine that drives the mower and also rotates the mower blade. A throttle controls the speed of the engine, and, if it is desired to slow down the speed at which the mower travels, the engine must be slowed down by control of the throttle, thereby causing the blade to be rotated at a slower speed that may be inadequate for proper cutting.

With modern self-propelled lawn mowers, typically there is a control handle that projects upwardly and rearwardly from the body of the mower. While the angular relationship of the control handle relative to the body is frequently adjustable, once adjusted and in use, the angular relationship is fixed. A throttle control and a drive engagement lever are typically pivotally connected to the control handle at a location spaced toward the lawn mower from that portion of the control handle that is intended to be gripped by the operator for steering of the lawn mower. Thus, if the throttle or the driving engagement lever is to be manipulated, the operator has but one hand to grip the steering portion, making it difficult to disengage the drive or throttle down the mower when one wishes to manipulate the mower around trees, shrubs or other obstructions.

The manipulation of the mower is further complicated in that, in order to meet safety regulations, "dead man" blade controls are now provided. The dead man control is typically a member that is pivotally carried by the control handle and connected by a linkage to a blade engagement mechanism such that the blade is driven when, but only when, the blade control member is grasped by the operator concurrently with grasping of the control handle. Thus, it is necessary to keep at least one hand on the control handle and the blade control member as one maneuvers around the trees, shrubs or other obstructions.

Prior self-propelled, walk-behind lawn mowers can be difficult to control as their take-off is often jerky. In addition, this type of lawn mower tends to "race away" from the operator when going down a hill. When going up a hill, the lawn mower tends to "drag." Once again, in order to adjust the speed of the lawn mower, the operator must remove one hand from the gripping portion and adjust the throttle.

Suggestion has been made in vacuum cleaner prior art to use a drive transmission design for a vacuum cleaner in a lawn mower. These vacuum cleaner transmissions have been intended to improve the performance of vacuum cleaners but, prior to the cleaner of the grandparent application, have met with limited success. While the suggestion has been made, because of adaptability and other problems, lawn mowers have not been made commercially available using any of the prior art vacuum cleaner or similar drive transmissions.

The parent patent application discloses a lawn mower having a drive transmission that was developed from the vacuum cleaner of the grandparent patent application. The parent drive transmission includes a driven member coupled to the engine for constant rotation about a driven axis, an output element axially aligned with the driven member, and a clutch operatively interposed between the driven member and the output element for selectively establishing a drive connection therebetween. A belt is trained around the output element and is also trained around a driven element that is operatively connected to a drive shaft to rotate the drive shaft and thereby wheels connected to it.

SUMMARY OF THE INVENTION

The present invention provides a variable-speed drive transmission for a self-propelled, walk-behind lawn mower that is an improvement over the parent patent application's drive transmission by providing greater reliability at lower cost through a simpler design with fewer parts. The improved transmission allows an operator to operate the lawn mower at speeds that are proportional to the operator forces applied to a control lever located on a mower handle and also causes the mower to accelerate and decelerate smoothly.

An additional feature of the invention allows the sensitivity of the transmission to operator applied forces to be adjusted to suit operator preference. The mower can be adjusted such that the transmission reacts very quickly to operator applied forces, more slowly to operator applied forces, or somewhere in between.

In accordance with the present invention, a self-propelled, walk-behind, variable-speed lawn mower has a frame structure, an engine mounted on the frame structure and wheels supporting the frame structure for movement along a ground surface. A drive shaft is connected to the frame structure and at least one of the wheels is drivingly connected to the drive shaft. A drive system is operatively interposed between the engine and the drive shaft, and includes a housing, an input gear operatively connected to the engine for constant rotation during operation, a stub shaft supported within the housing, and an intermediate gear meshed with the input gear and journaled on the stub shaft for rotation about the stub shaft. A driving bevel gear is also journaled on the stub shaft for rotation about the stub shaft. The driving bevel gear is meshed with a drive shaft bevel gear, which in turn is connected to the drive shaft. A face of the intermediate gear is biased away from a face of the driving bevel gear. A clutching surface is interposed between the gear faces for selectively establishing driving engagement between the intermediate gear and the driving bevel gear. An actuator is controllably connected to at least one of the intermediate gear and the drive bevel gear for controllably overcoming the bias between the two gears. The actuator is responsive to operator-applied forces for clutching the gears and controlling the variable speed at which the lawn mower traverses along the ground surface.

The lawn mower, like prior mowers, has a control handle. A drive control lever, preferably constructed similar to the dead man blade control, is pivotably mounted on the handle and linkage connected to the actuator. The dead man control and the drive control can be concurrently gripped with both hands as the operator grasps the control handle to steer the mower. As the operator varies the pressure on the drive control, speed is controlled as a function of the force applied to the drive control and transmitted to the actuator by the linkage. Accordingly, the operator can control the speed of the mower while keeping two hands on the control handle for steering of the mower, which greatly facilitates the maneuvering of the mower around obstacles.

Since the coupling transmitted force is a function of operator pressure, the lawn mower is caused to move at a speed that is proportional to the forces applied by an operator. The harder the operator pushes the lawn mower and thereby the drive control lever, such as, due to an operator's natural instincts when pushing the mower up a hill or when trying to move the mower at a greater speed, the greater the force and power supplied by the drive system. Conversely, when going down a hill, the operator's natural instinct is to apply less force to the drive control lever so that the lawn mower does not go "racing" down the hill.

In the preferred embodiment, the mower control handle, like the handles of prior walk-behind mowers, while adjustable, is in a fixed angular relationship with the mower when in use. As a consequence, if the mower is traversing on uneven terrain and, for example, a front wheel goes over a rock, the front of the mower will rise, pivoting the mower about the axis of rear drive wheels. This pivoting action lowers the mower control handle and results in an unintended increase of pressure on the drive control lever. This unintended increase of pressure on the drive control lever tends to cause the mower to speed up.

To overcome the problem of potential speed-up when the motor is traversing on uneven terrain, the linkage between the drive control lever and the actuator includes a biased connection. The biased connection absorbs forces induced by the terrain such as when one wheel goes over a rock. The force absorption modulates the amount of force that is applied to the actuator to minimize undesired acceleration or deceleration induced by uneven terrain.

Additionally, in order to allow the drive system to respond to operator-applied forces in a manner more suitable to an operator, the linkage between the drive control lever and actuator can be connected to the actuator in a selected one of a plurality of locations. The selected location controls the sensitivity of response of the drive system. If an operator wishes the drive system to react very quickly to applied forces, the linkage is connected to the actuator at a high leverage location. If the operator wishes the drive system to react less quickly to the applied forces, the linkage is connected to the actuator at a lower leverage location. In the preferred embodiment, there are two intermediate locations that are located between the highest and lowest leverage locations in order to provide intermediate levels of sensitivity.

The materials of the clutch have been optimized to achieve excellent wear and operating "feel." "Feel" refers to the sense the operator has of controlling the lawn mower speed. The preferred clutch materials consist of cork fabric located preferably on a face of the driving bevel gear while a face of the intermediate gear facing the cork is chrome-plated. These materials substantially prevent the clutch from jerking or grabbing when the drive system is engaged and allow for smooth, reliable control. Additionally, the materials have long life attributes that are important due to the slipping of the clutch during operation at all speeds other than full speed.

Accordingly, it is an object of the present invention to provide a new and improved self-propelled, walk-behind lawn mower, having a variable-speed transmission that is responsive to operator-applied forces as the operator maintains both hands on the steering control.

BRIEF DESCRIPTION OF THE DRAWINGS

FIGS. 3A-3C form an exploded view of the lawn mower drive transmission with corresponding letters of each figure indicating the interrelationship between views.

DETAILED DESCRIPTION OF THE PREFERRED EMBODIMENT

Figure 1:
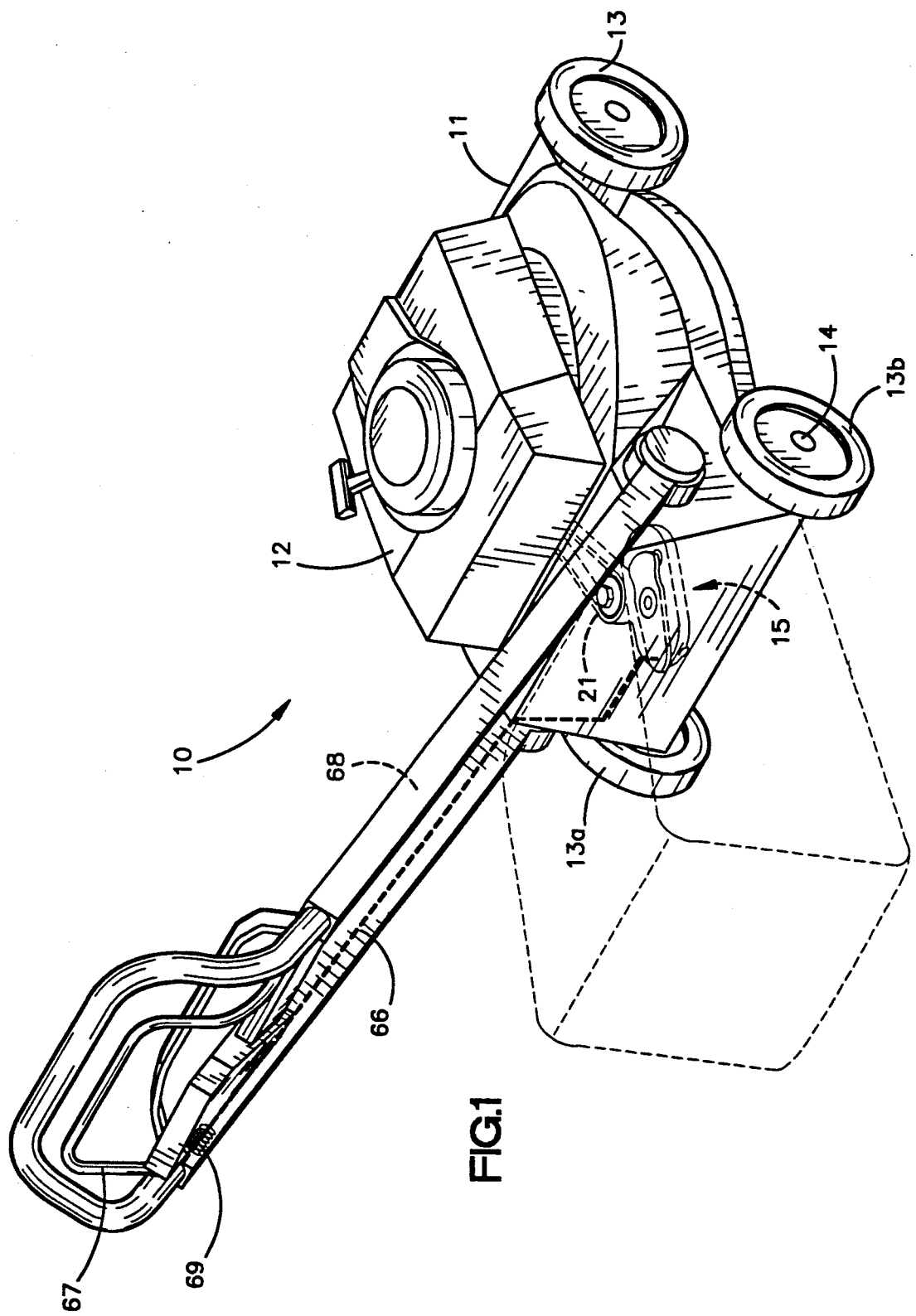
FIG. 1 is a perspective view of a lawn mower.

Turning to the drawings and to FIG. 1 in particular, a lawn mower 10 is illustrated. The mower 10 has a housing and frame structure 11 that carries an engine 12 and is supported by wheels 13. Two of the wheels 13a, 13b are located at the rear of the lawn mower 10. The wheels 13a, 13b are drivingly connected to opposite ends of a horizontal drive shaft 14. A drive transmission 15 is operatively interposed between the engine 12 and the drive shaft 14.

The drive transmission 15 is housed in a casing that includes an upper portion 17, a lower portion 18 and bracket 19. The drive transmission 15 includes an input pulley 20 operatively connected to the engine 12 via a flexible belt 21. The input pulley is mounted on a vertical input shaft 22. An input gear 23 is carried by the input shaft 22 and is located at an end opposite the input pulley 20. As best seen in FIG. 3C, washer 20a and nut 20b attach the pulley 20 to the shaft 22 by fastening the nut 20b to the shaft 22 at threads 22a. As shown in FIG. 3B, bearings 23a, 23b are located on opposite sides of the input gear 23, which is mounted on the shaft 22 at splined portion 22b. A snap ring 22c is placed about the shaft 22 at shaft 22d to help assure proper retention of the input gear 23.

The input gear 23 is meshed with an intermediate gear 24 that is preferably made of acetal. Powdered metal or cast iron are also suitable materials. The intermediate gear 24 is journaled on a vertical stub shaft 25 by a cylindrical anti-friction bearing assembly 26 (shown in FIGS. 2 and 3A). The stub shaft 25 is non-rotatably connected to a portion of the casing 19 at 27. During operation of the engine 12, the input pulley 20, input gear 23 and intermediate gear 24 constantly rotate.

Figure 2:
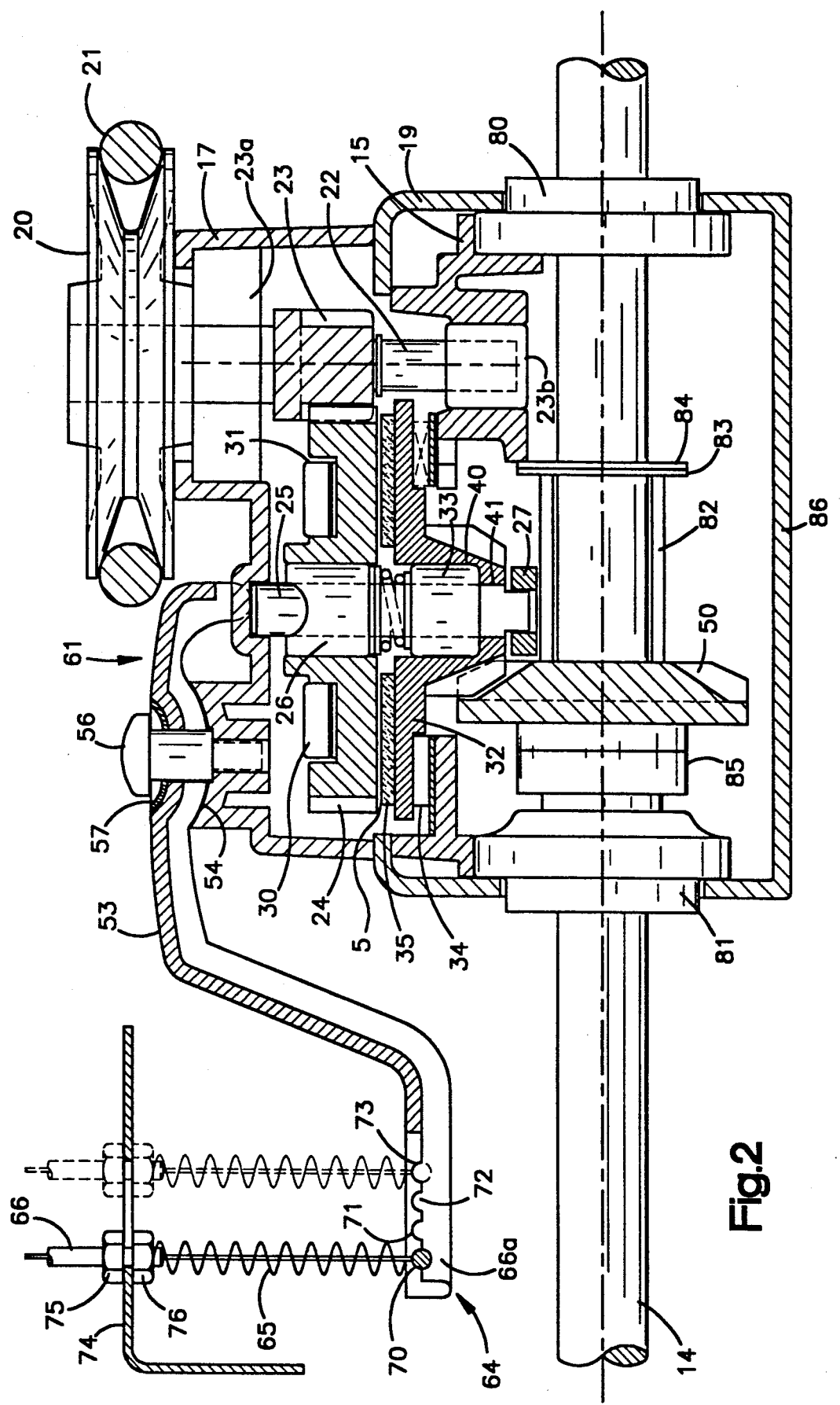
FIG. 2 is a vertical sectional view of a drive transmission embodying the present invention.
Figure 3A:
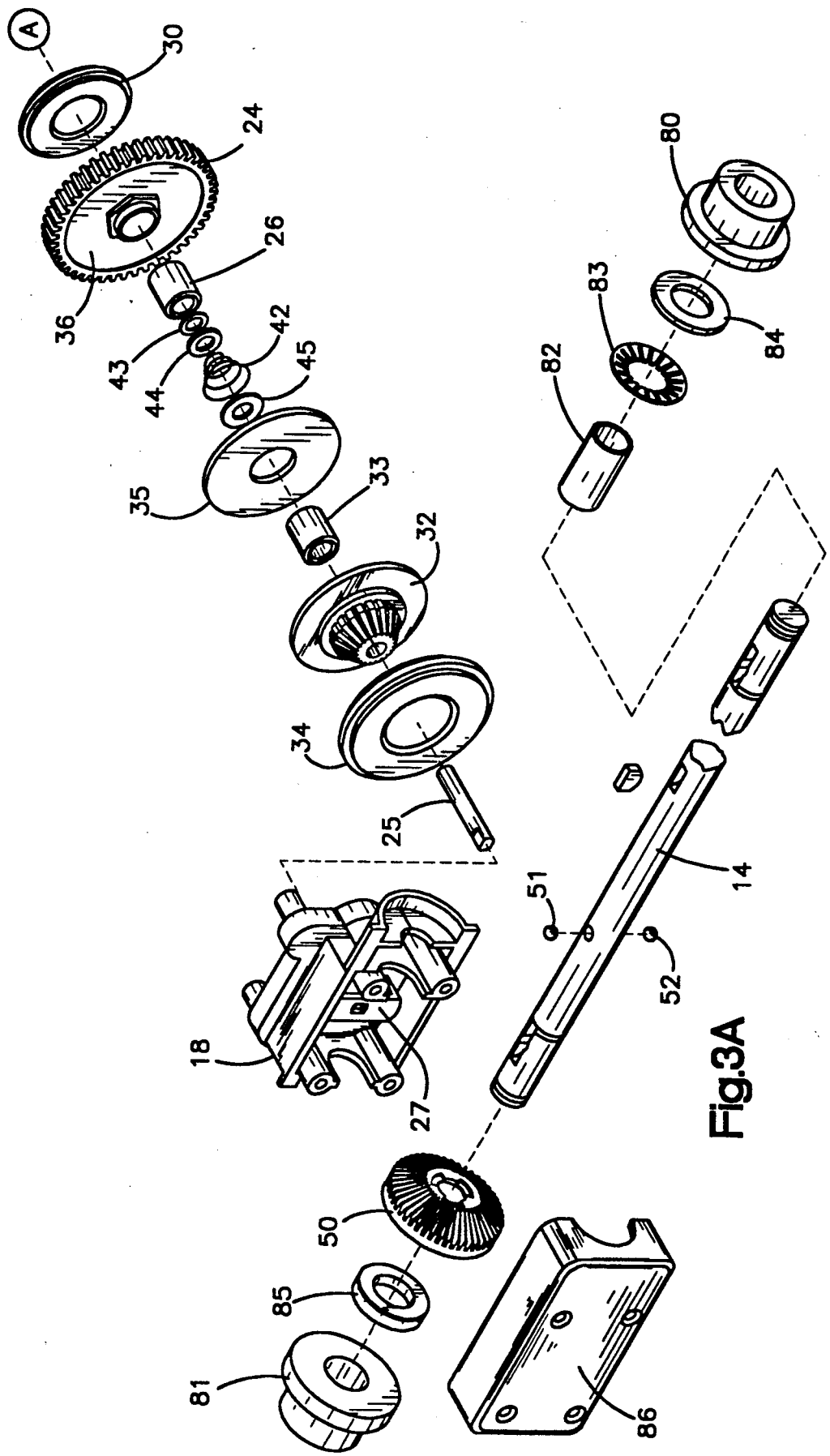

As best seen in FIGS. 2 and 3A, a thrust bearing assembly 30 is adjacent the intermediate gear 24. The bearing 30 has a plurality of radially oriented rollers between a pair of annular flat races. The rollers are circumferentially spaced about the shaft 30 of the gear 24. A flat, annular pocket or recess in a rear face of the gear 24 receives the associated thrust bearing race with a press fit.

As best seen in FIGS. 2 and 3A, a driving bevel gear 32 is adjacent the intermediate gear 24 and is disposed in confronting relation to the circular portion 31 of friction facing material to define a space S. The driving bevel gear 32 is journaled on the stub shaft 25 by an anti-friction bearing 33. A thrust bearing 34, similar to thrust bearing 30, is provided. The thrust bearing 34 is interposed between driving bevel gear 32 and the casing 19.

On a face of the driving bevel gear 32 opposite the thrust bearing 34, is a circular portion 35 of friction facing material. Unlike typical clutches which are not intended to slip once an operating speed is achieved, the operation of the present transmission relies on clutch slippage for speed control and therefore appropriate friction material and material selection of facing materials is extremely important. Preferably, the friction facing material is a cork fabric having a co-efficient of friction of 1.00. In a current prototype, the cork used is Armstrong NC-733 that is supplied by the Armstrong Industrial Products Division, Lancaster, Pa. 17604. Tests indicate this cork provides the best operator "feel" during use of the mower 10 and provides optimum wear of the friction facing material. The intermediate gear 24 includes an annular clutching surface 36 lying in a radial plane that contacts the circular portion 35 of friction facing material when the transmission 15 is engaged. Preferably, the intermediate gear 24 comprises powdered iron material to provide heat dissipation. The intermediate gear 24 is also chrome-plated with a layer of chrome from between 0.0001 and 0.0003 inches. However, other materials are acceptable as such materials that meet the correct co-efficient of friction and wear requirements when considered in combination with the cork material of the circular portion 35.

As best seen in FIG. 2, the driving bevel gear 32 has an axial bore 40 that is stepped in diameter to provide a clearance bore 41 for the stub shaft 25. The axial bore 40 is proportioned to receive the anti-friction bearing 33.

A spring 42 is mounted around the stub shaft 25 between the two anti-friction bearings 26, 33. Two washers 43, 44 are between the spring 42 and the anti-friction bearing 26, and another washer 45 is between the spring 42 and the driving bevel gear 32. The spring 42 is dimensioned to bias the intermediate gear 24 away from the driving bevel gear 32.

A drive shaft bevel gear 50 is in constant mesh with the driving bevel gear 32 and is carried for driving rotation on the drive shaft 14. The drive shaft bevel gear 50 is keyed to the drive shaft 14 by two balls 51, 52 to provide the driving relationship of the gear 50 to the shaft 14.

An actuator lever 53 is mounted in a spherical socket 54 integrally formed the upper portion 17 of the casing. The lever 53 has a complementary spherical boss 55 that fits into the socket 54 to form a ball joint. A shouldered bolt 56 extends through the axis of the socket 54 and the boss 55 to retain the actuator lever 53. The bolt 56 retains the lever 53 with adequate clearance to allow limited pivotal movement of the actuator lever on the upper portion 17 of the casing. As shown in FIG. 3C, an acetal spacer 57 is used to tension the boss 55 against the socket 54.

The actuator lever 53 has a spaced pair of projections 60 located near an end portion 61 of the actuator lever 53. The projections 60 project through associated holes 62 in the upper portion 17 of the casing and contact the stationary race of the thrust bearing assembly 30 at diametrically opposed points equa-distant from the race's center. Seals 63 are placed within the holes 62 and around projections 60.

At an end portion 64 opposite the end portion 61, the lever 53 engages a spring 65 that surrounds a control cable 66. As seen in FIG. 1, the cable 66 is connected to a drive engagement lever 67 of a lawn mower handle 68 via a surge suppression spring 69.

The end 64 of the actuator lever 53 has four spaced detents 70, 71, 72, 73 for receiving a connector 66a. The cable 66 and spring 65 can be connected to the lever 53 at a selected one of the four detents in order to vary the sensitivity of the response of the transmission 15 to the actuator lever 53. The spring 65 biases the connector 66a into place within the selected detent and helps ensure that the connection is maintained. By connecting the cable and spring to detent 70, a high mechanical advantage is provided and the response of the transmission 15 is the most sensitive. Conversely, by connecting the spring to the detent 73, the mechanical advantage is lower and the response of the transmission is the least sensitive. A bracket 74 connects the spring 65 and cable 66 to a lower portion of the handle 68 and also properly positions the cable relative to the lever 53 based upon the selected detent. By loosening nuts 75, 76, the spring and cable can be slidably adjusted horizontally relative to the end 64 and the position can be set by tightening the nuts 75, 76.

Turning to FIGS. 2 and 3A, the drive shaft 14 has bushings 80, 81 located at opposite ends to properly align the shaft within the lower portion 18 of the casing. A spacer 82 is located adjacent to the drive shaft bevel gear. A spring disk 83 is located opposite the drive shaft bevel gear 50 adjacent a washer 84. Opposite the bushing 80, a bearing 85 is placed between the bushing 81 and the drive shaft bevel gear 50. A cover 86 is attached to the lower casing 18 and covers the drive shaft bevel gear and a portion of the drive shaft 14.

Operation

When an operator of the lawn mower 10 exerts forces on the drive engagement lever 67 during operation of the lawn mower, these forces are transmitted through the cable 66 to the actuator lever 53 that activates the drive transmission 15 via the projections 60. The force transmitted by the projections 60 to the stationery race of the thrust bearing assembly 30 causes the intermediate gear 24 to compress against the spring 42 and thereby causes the clutching surface 36 to engage the friction facing material 35. Because during operation of the lawn mower the intermediate gear 24 is constantly rotating, the contact between the friction facing material 35 and the clutching surface 36 causes the driving bevel gear to begin rotation. The rotation of the driving bevel gear 32, in turn, rotates the drive shaft bevel gear 50 which, in turn, rotates the drive shaft 14 and rear wheels 13a, 13b, thereby causing the lawn mower to move forward.

The speed at which the lawn mower moves forward is controlled by the amount of force applied by the operator. The greater the force applied by the operator, the greater the force applied by the actuator lever 53, and the greater the contact pressure between the friction facing material 35 and the clutching surface 36. The increase of pressure reduces the amount of slip between the friction facing material and clutching surface 36 and therefore causes the drive shaft bevel gear 32 to rotate at a rate close to or equal to the rate at which the intermediate gear 24 rotates. With a lower amount of force applied by the operator to the drive engagement gear 67, the contact pressure between the friction facing material 35 and the clutching surface 36 is reduced. When this reduced pressure is applied, the driving bevel gear 32 will slip at a greater level relative to the intermediate gear, and will therefore rotate at a lower rate than the intermediate gear 24, thereby causing the lawn mower to move forward at a slower speed.

Sensitivity of the drive transmission 15 can be adjusted by connecting the connector 66a to a selected one of the detents 70, 71, 72, 73. By connecting the connector 66a to detent 70, movement at that portion of the lever in response to operator-applied forces causes greater movement of the projections 60, and thereby causes greater movement of the intermediate gear 24 against the driving bevel gear 32. By connecting the connector 66 to detent 73, the projections 60 move a lesser distance in response to operator-applied forces, and thereby cause less movement of the intermediate gear 24 against the driving bevel gear 32.

The springs 65, 69 cooperate to minimize variations in operator-applied clutch control forces induced by mower traverse of irregular terrain. Because the handle 68 is fixed relative the lawn mower 10, any bumps, such as a rock or a rut, that the lawn mower might encounter during operation could cause the lawn mower to lean or "rock" to a particular side. This type of lawn mower motion can cause the operator to react by applying forces to the handle 68, thereby causing a surge in the force applied to the transmission. The springs 65, 69 help modulate such forces. The lawn mower 10 will be able to traverse bumpy terrain and the springs will help absorb forces caused by any bumps, rather than allowing such forces to be imparted to the actuator lever 72 and thereby to the drive transmission 15.

While the preferred embodiment of the invention has been illustrated and described in detail, the present invention is not to be considered limited to the precise construction disclosed. Various adaptations, modifications and uses of the invention may occur to those skilled in the art to which the invention relates, and the intention is to cover hereby all such adaptations, modifications and uses which fall within the spirit or scope of the appended claims.

We claim:

1. A walk-behind, self-propelled, variable speed lawn mower comprising:
   a. a frame structure;
   b. an engine mounted on said frame structure;
   c. wheels supporting said frame structure for movement along a ground surface;
   d. a drive shaft rotatably connected to said frame structure, at least one of said wheels being drivingly connected to said drive shaft;
   e. a drive shaft bevel gear connected to said drive shaft;
   f. a drive system operatively interposed between said engine and said drive shaft comprising:
      i. a housing;
      ii. an input gear operatively connected to said engine for constant rotation during operation;
      iii. a stub shaft supported within said housing;
      iv. an intermediate gear having a face, the intermediate gear being meshed with said input gear and journaled on said stub shaft for rotation about said stub shaft;
      v. a driving bevel gear having a face, the driving bevel gear being meshed with said drive shaft bevel gear and journaled on said stub shaft for rotation about said stub shaft;
      vi. biasing means for biasing the face of said driving bevel gear away from the face of said intermediate gear; and,
      vii. clutching means interposed between said intermediate gear and said driving bevel gear for coupling said intermediate gear and said driving bevel gear in driving engagement;
   g. actuator means controllably connected to at least one of said intermediate gear and said driving bevel gear for controllably overcoming said biasing means and responsive to operator applied forces for controlling the speed at which said lawn mower traverses along said ground surface and to vary the speed proportionally to said operator applied forces; and,
   h. a handle movably connected to said frame and operatively connected to said actuator means, said handle being adapted to move in response to said operator applied forces whereby the speed and direction of the mower are controlled by the operator without his being required to remove one of his hands.

2. The lawn mower of claim 1 wherein said input gear is keyed to an input shaft for rotation with said input shaft, said input shaft having a pulley at a first end that is connected to said engine by a belt.

3. The lawn mower or claim 1 wherein said clutching means includes a portion of friction facing material comprised of cork carried by a selected one of said faces of said driving bevel gear and said intermediate gear.

4. The lawn mower of claim 1 wherein said handle is connected to said actuator means via a linkage including a spring for minimizing variations in the force applied to said actuator means due to variations of said ground surface.

5. The lawn mower of claim 4 wherein said actuator means comprises an actuator lever having a pair of projections that engage said intermediate gear, said projections having axes paralleling an axis of rotation of said intermediate gear.

6. The lawn mower of claim 5 wherein said actuator lever is spherically mounted on said housing.

7. The lawn mower of claim 1 wherein said input gear is keyed to an input shaft for rotation with said input shaft, said input shaft having a pulley at a first end that is connected to the engine by a belt.

8. A walk-behind, self-propelled, variable speed lawn mower comprising:
   a. a frame structure;
   b. an engine mounted on said frame structure, the engine being for producing output forces when in use;
   c. wheels supporting said frame structure for movement along a ground surface;
   d. a drive shaft, at least one of said wheels being drivingly connected to said drive shaft;
   e. a drive system operatively interposed between said engine and said drive shaft comprising:
      i. gearing operatively connected to said engine and said drive shaft for transmitting such output forces from said engine to said shaft, the gearing including an element; and,
      ii. clutching means including a frictional coupling coactable with said element of said gearing selectively to transmit such engine output forces to the shaft;
   f. actuator means controllably connected to gearing and responsive to operator applied forces for controlling the speed at which said lawn mower traverses along said ground surface and to vary the speed proportionally to operator applied forces; and, g. a handle movably connected to said frame and operatively connected to said actuator means in a selected one of a plurality of locations, said selected location controlling the sensitivity of response of the drive system to operator applied forces.

9. The lawn mower of claim 8 wherein said handle is connected to said actuator means via a linkage including a spring for minimizing variations in the force applied to said actuator means due to variations of said ground surface.

10. The lawn mower of claim 8 wherein said actuator means comprises an actuator lever having a pair of projections that engage said gearing, said projections having axes paralleling an axis of rotation of an intermediate gear forming a part of the gearing.

11. The lawn mower of claim 10 wherein said actuator lever is spherically mounted on a housing containing said drive system.

12. The lawn mower of claim 11 wherein said handle is connected to said actuator lever via a linkage including a spring for minimizing variations in the force applied to said actuator means due to variations of said ground surface.

13. The lawn mower of claim 8 wherein said operative connection of the handle to the actuator means comprises an adjustable connection means that is selectively positionable in one of a plurality of position each of the positions providing a lever mechanical advantage different that the mechanical advantage of the other of the positions to selectively adjust the mechanical advantage of operator force transmission to suit the desires of an operator.

14. The lawn mower of claim 13 wherein the connection means comprises a cable and a connector selectively positionable one at a time in a selected one of a plurality of detents in the lever.

15. A walk-behind, self-propelled, variable speed lawn mower comprising:
 a. a frame structure;
 b. an engine mounted on said frame structure;
 c. wheels supporting said frame structure for movement along a ground surface;
 d. a drive shaft rotatably connected to said frame structure, at least one of said wheels being drivingly connected to said drive shaft;
 e. a drive shaft bevel gear connected to said drive shaft;
 f. a drive system operatively interposed between said engine and said drive shaft comprising:
  i. a housing;
  ii. an input shaft rotatably supported within said housing;
  iii. an input gear connected to said input shaft for rotation with said input shaft, said input shaft having a pulley at a first end that is connected to the engine with a belt for constant rotation during operation;
  iv. a stub shaft rotatably supported within said housing;
  v. an intermediate gear having a face, the intermediate gear being meshed with said input gear and journaled on said stub shaft for rotation about said stub shaft;
  vi. a driving bevel gear having a face, the driving bevel gear being meshed with said drive shaft bevel gear and journaled on said stub shaft for rotation about said stub shaft;
  vii. a spring interposed between said driving bevel gear and said intermediate gear biasing the face of said driving bevel gear away from the face of said intermediate gear; and,
  viii. clutching means interposed between said intermediate gear and said driving bevel gear, the clutching means including a portion of friction facing material comprised of cork carried by said face of said driving bevel gear;
 g. an actuator lever having a pair of projections that engage said intermediate gear, said projections having axes paralleling an axis of rotation of said intermediate gear, said lever being responsive to operator applied forces for controlling the speed at which said lawn mower traverses along said ground surface and to vary the speed proportionally to operator applied forces; and,
 h. a handle movably connected to said frame structure and operatively connected to said actuator means in a selected one of a plurality of locations via a linkage that includes a spring for minimizing variations in the force applied to said actuator lever due to variations of said ground surface, said selected location controlling the sensitivity of response of the drive system to operator applied forces.

16. The lawn mower of claim 15 wherein said actuator lever is spherically mounted on said housing.

17. For use in a walk-behind, self-propelled lawn mower, a drive system comprising:
 a. a housing;
 b. an input gear operatively connected to an engine for constant rotation during operation;
 c. a stub shaft rotatably supported within said housing;
 d. an intermediate gear having a face, the intermediate gear being meshed with said input gear and journaled on said stub shaft for rotation about said stub shaft;
 e. a driving bevel gear having a face, the driving bevel gear being journaled on said stub shaft for rotation about said stub shaft;
 f. biasing means for biasing the face of said driving bevel gear away from the face of said intermediate gear; and,
 g. clutching means interposed between said intermediate gear and said driving bevel gear for coupling said intermediate gear and said driving bevel gear in driving engagement.

18. The drive system of claim 17 wherein said clutching means includes a portion of friction facing material comprised of cork carried by said face of said driving bevel gear.

19. The drive system of claim 18 wherein the biasing means is a spring.

20. In a power drive lawn mower, including a prime mover and a power train for drivingly connecting the prime mover to a drive wheel, a speed control mechanism comprising:
 a) a slippable clutch, the clutch being a speed control part of the power train;
 b) a lever means operatively connected to the clutch for transmitting operator-applied forces to the clutch and thereby varying the speed at which said drive wheel drives the mower in relation to variation of forces applied by an operator;
c) the lawn mower including a relatively removable, operator-actuated speed control element;
d) a mechanism interposed between and connected to the element and the lever for transmitting operator forces from the element to the lever; and
e) adjustable connection means forming the mechanism to lever connection and being selectively positionable in one of a plurality of adjustment positions, each of the positions providing a lever mechanical advantage, the mechanical advantage of each adjustment position being different than the mechanical advantage provided by other of the positions whereby selection of an adjustment position adjusts the mechanical advantage of operator force transmission to suit the desires of an operator.

21. The lawn mower of claim 20 wherein the mechanism includes a surge suppression means to modulate the speed modifying effects of rough terrain.

22. The lawn mower of claim 21 wherein the surge suppression means includes at least one spring.

23. The lawn mower of claim 20 wherein the connection means comprises a cable and a connector selectively positionable one at a time in a selected one of a plurality of detents in the lever.

* * * * *